United States Patent [19]

Nelle

[11] 4,136,958
[45] Jan. 30, 1979

[54] ENCAPSULATED MEASURING APPARATUS

[75] Inventor: Gunther Nelle, Siegsdorf, Fed. Rep. of Germany

[73] Assignee: Dr. Johannes Heidenhain GmbH, Traunreut, Fed. Rep. of Germany

[21] Appl. No.: 797,454

[22] Filed: May 16, 1977

[30] Foreign Application Priority Data

May 26, 1976 [DE] Fed. Rep. of Germany ....... 2623526

[51] Int. Cl.² ............................................. G01D 11/24
[52] U.S. Cl. .................................. 356/395; 33/125 C; 250/237 G
[58] Field of Search ............................. 356/169, 172; 250/237 G; 33/125 C

[56] References Cited

U.S. PATENT DOCUMENTS

| | | | |
|---|---|---|---|
| Re. 29,281 | 6/1977 | Burns et al. | 356/169 |
| 3,533,703 | 10/1970 | Wingate | 250/237 G |
| 4,031,595 | 6/1977 | Welker | 356/169 |

FOREIGN PATENT DOCUMENTS 2032585  1/1971  Fed. Rep. of Germany.

*Primary Examiner*—John K. Cobin
*Assistant Examiner*—R. A. Rosenberger
*Attorney, Agent, or Firm*—Hume, Clement, Brinks, Willian & Olds Ltd.

[57] ABSTRACT

An encapsulated measuring apparatus including a hollow body provided with a longitudinal aperture, a measuring scale and a scanning assembly positioned within the hollow body, connecting means for attaching the scanning assembly to a mounting, and sealing means for the aperture extending from walls of the hollow body and positioned so that the surfaces of the sealing means which contact the connecting means are lower than inner surfaces of the hollow body whereby penetrating liquids flow freely from the hollow body.

11 Claims, 3 Drawing Figures

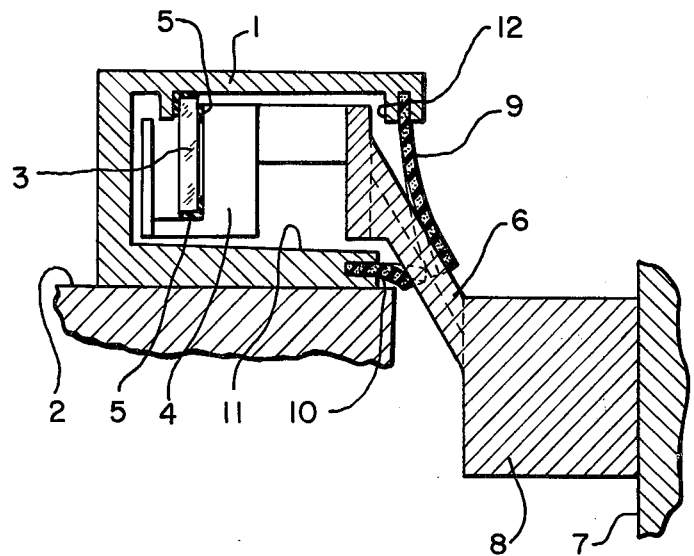
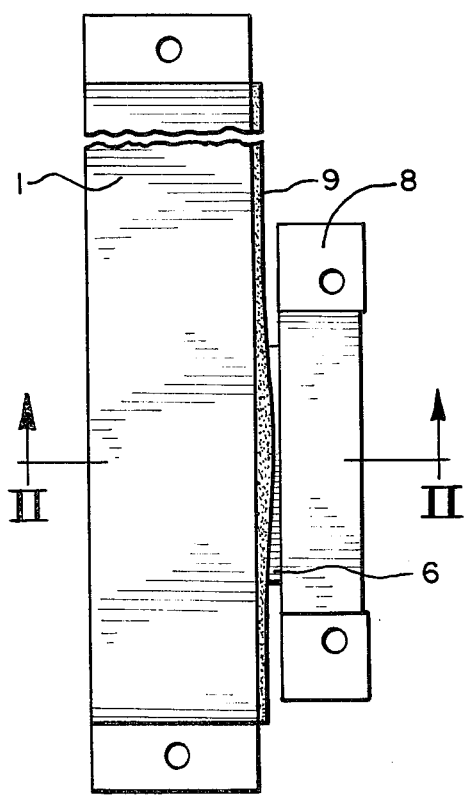
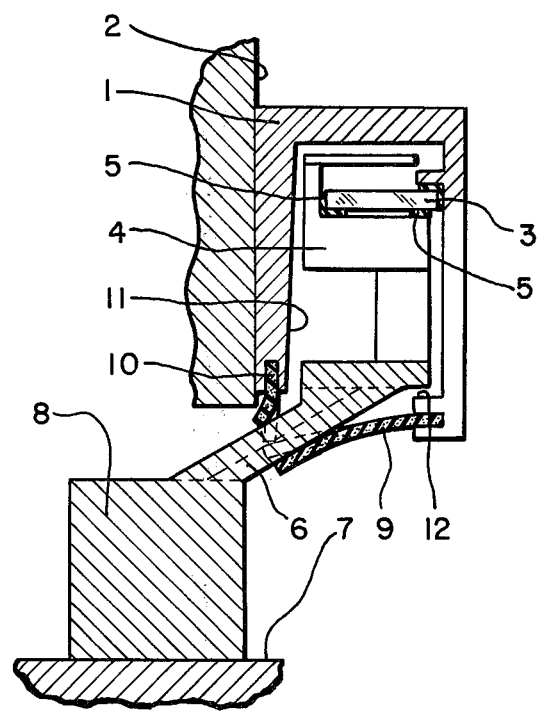

ENCAPSULATED MEASURING APPARATUS

BACKGROUND OF THE INVENTION

1. Field of the Invention

The invention relates to an encapsulated measuring apparatus usable in several mounting positions, including a measuring scale and a scanning assembly, both of which are placed in a prismatic hollow body for protection against environmental influences. The prismatic hollow body is provided with an aperture which is continuous in a direction of measurement and is sealed by means of sealing members. A means for connecting the scanning assembly to another object, such as the carriage of a machine tool, extends through the aperture.

2. Description of the Prior Art

In the prior art measuring apparatus are provided, such as disclosed in Burns. U.S. Pat. No. 3,833,303, wherein a slot is mounted in one of the walls of the hollow body and is sealed by means of flexible sealing lips arranged in a roof-like manner. The slot, and in particular the area where the sealing lips meet, are near the center of a wall of the hollow body, and the sealing lips are fastened to remaining projecting bridges or seal retainers of identical length. Encapsulated measuring apparatus with sealing lips applied near the center of the wall of the hollow body are arrangeable only in certain mounting positions, otherwise there would be danger of penetrating liquid such as coolant fluids collecting within the hollow body and possibly causing contaminations at the measuring rod.

West German Offenlegungsschrift No. 2,032,585 discloses an encapsulated measuring apparatus with roof-shaped sealing lips arranged near the edge of the hollow body. More specifically the sealing lips are accommodated inside the hollow body. In that encapsulated measuring apparatus penetrating liquid such as coolant fluids also collects within the hollow body in certain mounting positions, particularly where the connecting means for the scanning unit occupies a horizontal position, so that the penetrating liquid can only flow off from the columns at the sealing lips after reaching a certain level.

SUMMARY OF THE INVENTION

According to the present invention an encapsulated measuring apparatus is provided which overcomes the disadvantages of the prior art by permitting a plurality of possible mounting positions of the measuring apparatus without allowing any significant amounts of contamination of parts of the measuring apparatus by penetrating liquid, such as coolant fluid.

In a preferred embodiment of the present invention there is provided a measuring apparatus including a measuring scale and a scanning assembly housed within a hollow body, wherein the measuring scale and scanning assembly are protected from environmental contamination by sealing lips extending from walls of the hollow body. The sealing lips protrude from the hollow body at an angle such that their effective sealing surface is positioned lower than edges of the hollow body in a number of positions.

Accordingly, the present invention provides an improved measuring apparatus which can be mounted in a plurality of positions and still achieve the advantage of allowing liquid which has penetrated into the hollow body to easily flow out through gaps in the sealing lips rather than remain in the hollow body to contaminate the body and the devices mounted therein. Other advantages, objects, and features of the present invention will become apparent upon reading the following detailed description of the preferred embodiments in conjunction with the accompanying drawings.

BRIEF DESCRIPTION OF THE DRAWINGS

FIG. 1 is a reduced top plan view upon the encapsulated measuring apparatus of the present invention;

FIG. 2 is a cross-sectional view of the measuring apparatus of FIG. 1 taken along line II—II;

FIG. 3 is a cross-sectional view of the measuring apparatus of FIG. 1 taken along line II—II and rotated 90° from the view of FIG. 2.

DESCRIPTION OF THE PREFERRED EMBODIMENTS

Referring now to the drawings, reference numeral 1 identifies a housing member such as a hollow body mounted to a bed 2 of a machine. A scale 3 is fastened within the hollow body 1 preferably by an adhesive. A scanning assembly 4 is seated directly at the scale 3 by means of sliding shoes 5. In this embodiment the scale 3 and the scanning assembly 4 are components of a known incremental measuring system.

A connecting means 6, having a bladed portion designed in a well-known manner with a sword-like cross-section, connects the scanning assembly 4 to a machine carriage 7, whose displacement is to be measured. The connecting means 6 is fastened to the carriage 7 by a mounting leg 8.

The hollow body 1 has an aperture extending longitudinally fully therethrough in a measuring direction and extending transversely to the measuring direction as far as an inner wall 11 of the hollow body 1. The aperture is sealed by means of flexible sealing lips 9 and 10 arranged in a roof-like manner. The sealing lips 9 and 10 protrude from the hollow body 1 at such an angle that the effective sealing area is placed approximately in the range of an edge of the hollow body 1.

In the preferred embodiment of the invention, as shown in FIG. 2, the sealing lips 9 and 10 are fastened to the walls of the hollow body 1 thus limiting the aperture in such a manner that the effective sealing surface of the sealing lips 9 and 10 is positioned lower than the inner surfaces 11 and 12 of the shaft formed by the hollow body 1. Moreover, the connecting means 6 for the scanning assembly 4 is positioned, in the area near the sealing lips 9 and 10, obliquely to a mounting surface, such as bed 2, for the hollow body 1. This relationship of the sealing lips 9 and 10 to the surfaces 11 and 12 is present even in embodiments of the present invention in which the mounting position of the measuring apparatus is altered, such as in FIG. 3, wherein the mounting position is rotated by 90° with respect to the apparatus of FIG. 2.

The present invention allows liquid which has penetrated to immediately flow out through the gaps of the sealing lips 9 and 10 created at the terminal ranges of the sword-like connecting means 6. The discharge of any ingressing or penetrating liquid is also facilitated by the tapering thickness of the walls of the hollow body 1, in the area in which the sealing lips 9 and 10 are fastened. The direction of the tapering of the walls is preferably toward the aperture.

Though the embodiments hereinbefore described are preferred, many modifications and refinements which do not depart from the true spirit and scope of the invention may be conceived by those skilled in the art. It is intended that all such modifications be covered by the following claims.

I claim:

1. In an encapsulated measuring apparatus including a measuring scale, a scanning assembly for scanning the scale, and means for connecting the scanning assembly to a mounting, the improvement comprising:

a housing member for substantially surrounding the scale and the scanning assembly, said housing member defining an elongated aperture extending substantially along a longitudinal direction through which the connecting means passes and an inner surface, said housing member configured such that, for both a first orientation of the housing member and a second orientation, rotated about the logitudinal direction by substantially 90° with respect to the first orientation, the aperture is positioned to permit a fluid contained in the housing member to substantially completely drain out of the housing member through the aperture; and means for sealing the aperture around the connecting means, said sealing means including a sealing surface adjacent the connecting means, said sealing means configured such that at least a portion of the sealing surface is positioned substantially no higher than the inner surface in both the first and second orientations in order to permit the drainage of fluid contained in the housing member out of the housing member between the sealing means and the coupling means.

2. The improvement of claim 1, wherein the sealing means include a plurality of flexible sealing lips arranged in a roof-like manner on the housing member to extend across the aperture between the housing member and the coupling means.

3. The improvement of claim 2, wherein the flexible sealing lips are of unequal length.

4. The improvement of claim 1, wherein the thickness of a wall adjacent the aperture of the housing member tapers in the direction of the aperture.

5. The improvement of claim 1, wherein the housing member is mounted to a mounting surface and the coupling means is oriented obliquely to the mounting surface in the area near the sealing means.

6. An encapsulated measuring apparatus comprising:
an elongated measuring scale extending substantially along a longitudinal direction;
a scanning assembly for scanning the scale;
a housing member substantially surrounding the scale and the scanning assembly, said housing member defining a lateral inner wall surface and a longitudinal aperture extending transverse to the inner wall surface adjacent an edge of the inner wall surface;
means for connecting the scanning assembly to a mounting outside the housing member;
first and second flexible sealing lips mounted on the housing member at first and second sides of the aperture, respectively, said sealing lips extending across the aperture toward the connecting means and defining sealing surfaces through which the connecting means passes, at least a portion of said sealing surfaces situated outside the housing member such that, when the housing member is placed in a first orientation, fluid inside the housing member substantially completely drains out of the housing member through the aperture and between the sealing surfaces and the connecting means, and further, when the housing member is placed in a second orientation rotated about the longitudinal direction by about 90° with respect to the first orientation, fluid substantially completely drains out of the housing member through the aperture and between the sealing surfaces and the connecting means.

7. The measuring apparatus of claim 6, wherein the lateral inner wall surface of the housing member is formed by a wall and the thickness of said wall tapers such that the lateral inner wall surface slopes downward toward the aperture in both the first and second orientations.

8. The measuring apparatus of claim 6, wherein the connecting means passes through the aperture at an angle oblique to the lateral inner wall surface.

9. The measuring apparatus of claim 6, wherein the length of the first sealing lip is shorter than the length of the second sealing lip.

10. The measuring apparatus of claim 6, wherein the housing member, sealing lips, and connecting means are arranged such that at least a portion of both the aperture and the sealing surfaces are positioned at least as low as the inner wall surface in both the first and the second orientations.

11. The measuring apparatus of claim 6, wherein:
the lateral inner wall surface of the housing member is formed by a wall and the thickness of the wall tapers such that the lateral inner wall surface slopes downward toward the aperture in both the first and second orientations;
the connecting means passes through the aperture at an angle oblique to the inner wall surface;
the length of the first sealing lip is shorter than the length of the second sealing lip;
the housing member, sealing lips, and connecting means are arranged such that at least a portion of both the aperture and the sealing surfaces are positioned at least as low as the inner wall surface in both the first and second orientations.

* * * * *

UNITED STATES PATENT AND TRADEMARK OFFICE
CERTIFICATE OF CORRECTION

PATENT NO. : 4,136,958
DATED : January 30, 1979
INVENTOR(S) : Gunther Nelle

It is certified that error appears in the above–identified patent and that said Letters Patent are hereby corrected as shown below:

Column 1, line 19, after "Burns" delete ".".

Signed and Sealed this

Fifth Day of June 1979

[SEAL]

Attest:

RUTH C. MASON
Attesting Officer

DONALD W. BANNER
Commissioner of Patents and Trademarks